United States Patent
Babaheidarian

(10) Patent No.: US 12,165,029 B2
(45) Date of Patent: Dec. 10, 2024

(54) NEURAL NETWORK COMPUTATION FOR EIGEN VALUE AND EIGEN VECTOR DECOMPOSITION OF MATRICES

(71) Applicant: QUALCOMM Incorporated, San Diego, CA (US)

(72) Inventor: Parisa Babaheidarian, Acton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1034 days.

(21) Appl. No.: 17/119,912

(22) Filed: Dec. 11, 2020

(65) Prior Publication Data
US 2022/0188594 A1 Jun. 16, 2022

(51) Int. Cl.
*G06N 3/04* (2023.01)
*G06F 17/16* (2006.01)
*G06N 3/08* (2023.01)

(52) U.S. Cl.
CPC .............. *G06N 3/04* (2013.01); *G06F 17/16* (2013.01); *G06N 3/08* (2013.01)

(58) Field of Classification Search
CPC .......... G06F 17/16; G06N 3/04; G06N 3/044; G06N 3/045; G06N 3/08; G06N 3/084; G06N 3/088; G06N 7/01; H04L 25/0248; H04L 25/0254
See application file for complete search history.

(56) References Cited

U.S. PATENT DOCUMENTS

2019/0164047 A1* 5/2019 ter Haar Romenij ....................... G06V 10/764

OTHER PUBLICATIONS

Acharya et al., "Covariance Pooling for Facial Expression Recognition", May 13, 2018, CVPR workshop, pp. 480-487. (Year: 2018).*

* cited by examiner

*Primary Examiner* — Brent Johnston Hoover
(74) *Attorney, Agent, or Firm* — QUALCOMM Incorporated

(57) ABSTRACT

A method performs eigen decomposition with an artificial deep neural network. The deep neural network receives an input covariance matrix. The deep neural network has a number of convolutional layers and also a number of pooling layers. The deep neural network predicts dominant eigen information of the input covariance matrix, after applying the convolutional layers and the pooling layers to the input covariance matrix. The input covariance matrix may be a real-valued covariance matrix or a complex-valued covariance matrix having a concatenated pair of matrices, including a first matrix of real components and a second matrix of imaginary components. The dominant eigen information may be absolute values of a pair of dominant eigen values and sign information of the pair of dominant eigen values, and/or absolute values of a pair of dominant eigen vectors and sign information of the pair of dominant eigen vectors.

24 Claims, 13 Drawing Sheets

1200 →

1202 — RECEIVE AN INPUT COVARIANCE MATRIX.

1204 — APPLY A NUMBER OF CONVOLUTIONAL LAYERS AND POOLING LAYERS TO THE INPUT COVARIANCE MATRIX.

1206 — PREDICT DOMINANT EIGEN INFORMATION OF THE INPUT COVARIANCE MATRIX, AFTER APPLYING THE NUMBER OF CONVOLUTIONAL LAYERS AND THE NUMBER OF POOLING LAYERS TO THE INPUT COVARIANCE MATRIX.

PRELU function with parameter a

| NN layers for the eigen vector extraction (predicted absolute values only) for 8×8 real-valued covariance input |
|---|
| 8×8×8 CONV2D |
| 8×8×16 CONV2D |
| 2×2 AVG POOLING |
| 4×4×32 CONV2D |
| 2×2 AVG POOLING |
| 2×2×64 CONV2D |
| 2×2 AVG POOLING |
| 1×1×64 CONV2D |
| 1×1×64 CONV2D |
| 8×8×1 RESHAPE |

*FIG. 11*

NEURAL NETWORK COMPUTATION FOR EIGEN VALUE AND EIGEN VECTOR DECOMPOSITION OF MATRICES

FIELD OF THE DISCLOSURE

Aspects of the present disclosure generally relate to machine learning techniques, and more particularly to techniques and apparatuses for neural network predictions for dominant eigen vectors and dominant eigen values of matrices.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

According to an aspect of the present disclosure, a method performs eigen decomposition with an artificial deep neural network. The neural network receives an input covariance matrix. The method applies a number of convolutional layers and pooling layers to the input covariance matrix. The neural network predicts dominant eigen information of the input covariance matrix, after applying the number of convolutional layers and the number of pooling layers to the input covariance matrix.

In another aspect of the present disclosure, an apparatus for wireless communications at a device, includes a processor and memory coupled with the processor. Instructions stored in the memory are operable, when executed by the processor, to cause the apparatus to receive an input covariance matrix. The apparatus can apply multiple convolutional layers and pooling layers to the input covariance matrix. The apparatus predicts dominant eigen information of the input covariance matrix, after applying the convolutional layers and the pooling layers to the input covariance matrix.

In another aspect of the present disclosure, an apparatus includes means for receiving an input covariance matrix. The apparatus includes means for applying a number of convolutional layers and pooling layers to the input covariance matrix. The apparatus further includes means for predicting dominant eigen information of the input covariance matrix, after applying the convolutional layers and the pooling layers to the input covariance matrix.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 11 is a diagram illustrating an example neural network architecture for predicting absolute values of elements of eigen vectors of a 8×8 real-valued input covariance matrix, in accordance with various aspects of the present disclosure.

DETAILED DESCRIPTION

Figure 1:
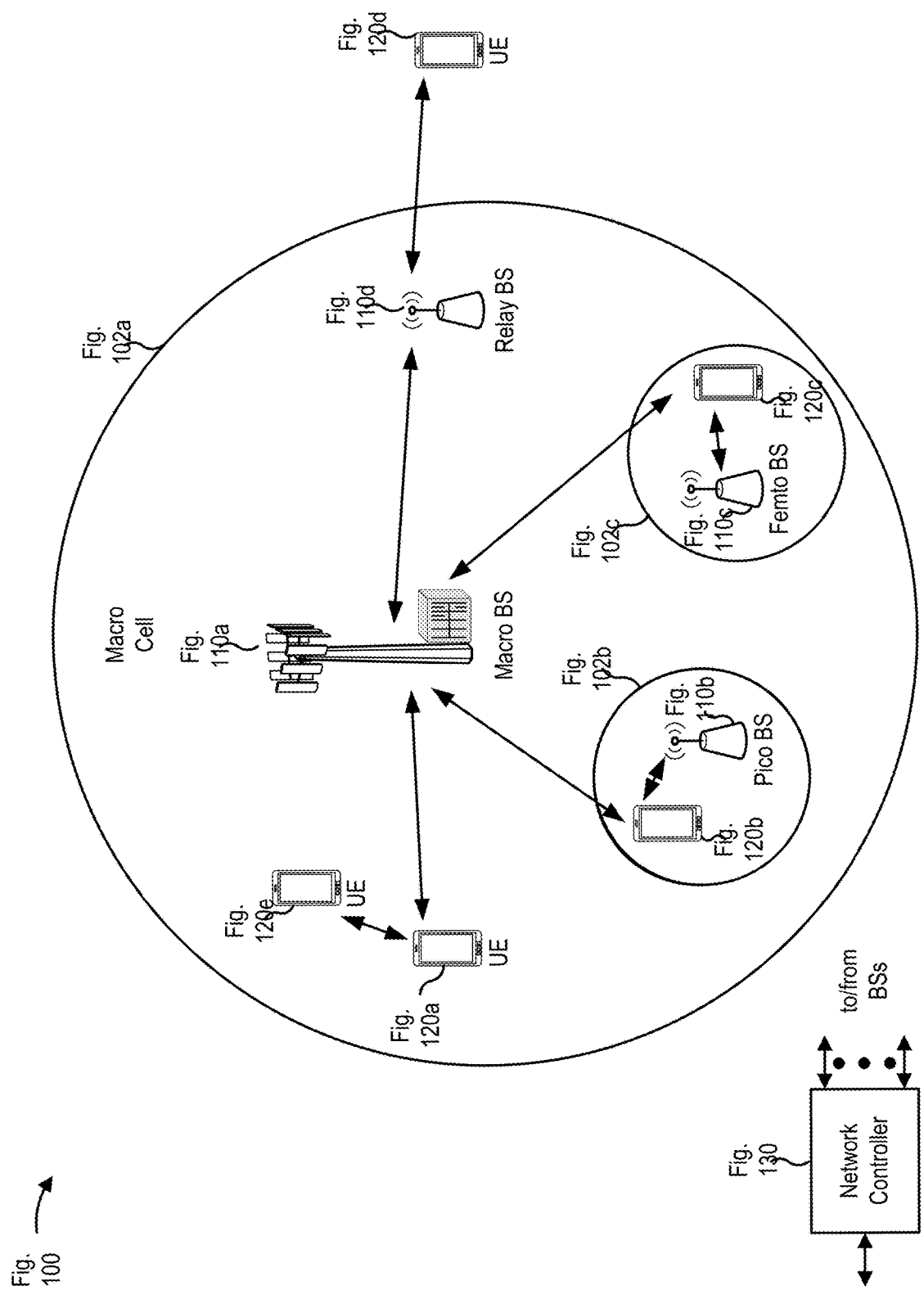
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Eigen value and eigen vector decomposition (EVD) provides an orthonormal basis to capture variations in data. Eigen value/vector decomposition has a broad range of applications, such as channel state feedback and multiple input multiple output (MIMO) systems, ranking in search engines and recommendation systems, and prediction in Markov processes such as the stock market. Additional examples of EVD applications include solving linear systems of equations and classification algorithms.

Conventional algorithms for eigen value/vector decomposition often rely on iterative algebraic solutions. These iterative solutions are suitable for well-conditioned matrices. Examples of such techniques include the power iteration, Givens iteration and Jacobi method, Householder transformation, and Lanczos iterations. While conventional algorithms offer fairly accurate solutions, the complexity of their implementation is usually high, as the number of iterations increases. Moreover, assumptions are needed to ensure these solutions converge.

According to aspects of the present disclosure, a new technique predicts eigen values/vectors using neural networks. This new technique is twice as efficient as the well-known Jacobi iterations and estimates dominant eigen pairs with comparable accuracy. An eigen pair is an eigen value and its associated eigen vector. A dominant eigen pair is the eigen pair with the highest energy, or equivalently eigen pair corresponding to the highest absolute eigen value.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
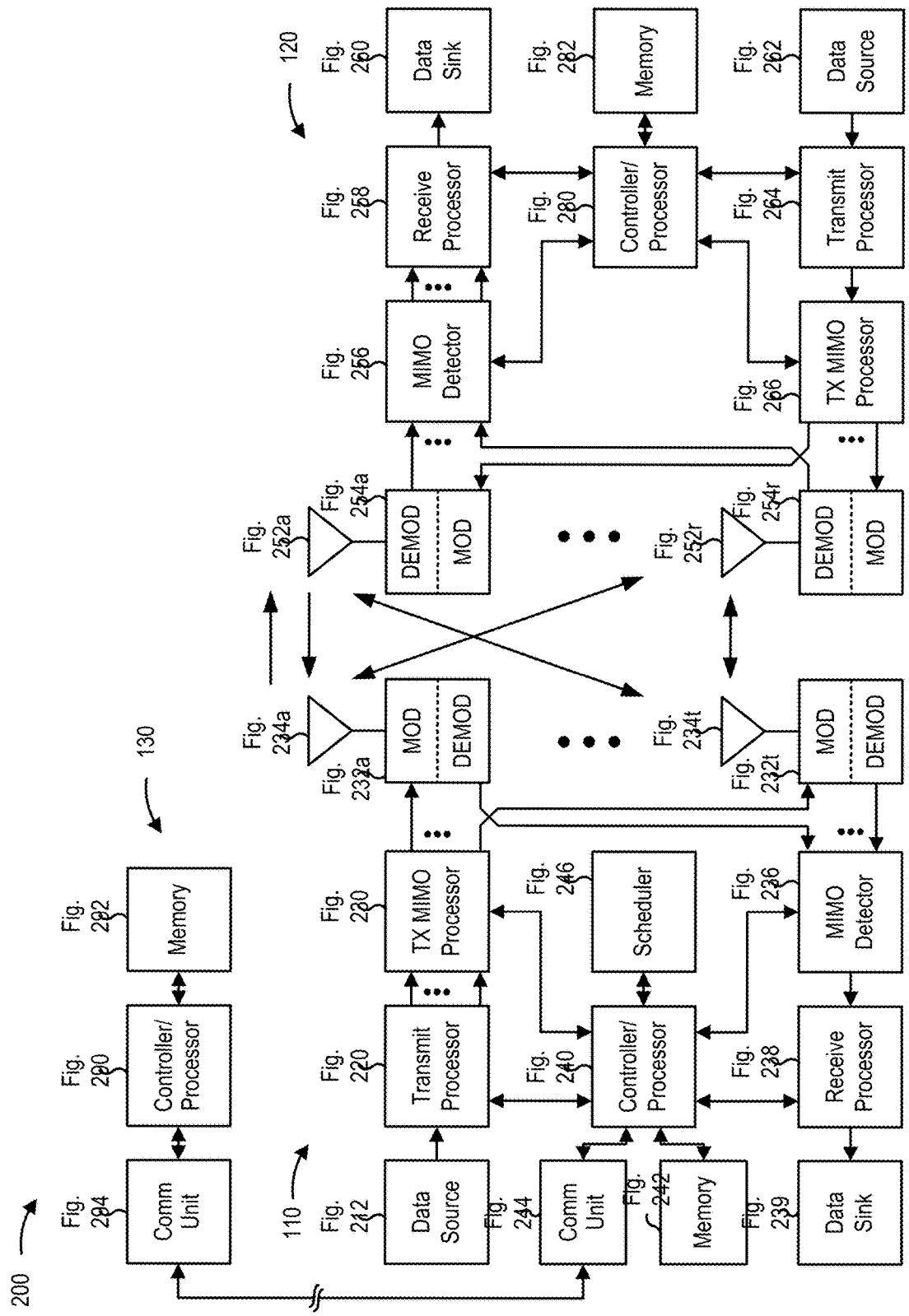
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more machine learning techniques associated with eigen value and eigen vector decomposition, as described in more detail elsewhere. For example, the controller/processor 240 of the base station 110, the controller/processor 280 of the UE 120, and/or any other component(s) of FIG. 2 may perform or direct operations of, for example, the processes of FIG. 1 and/or other processes as described. Memories 242 and 282 may store data and program codes for the base station 110 and UE 120, respectively. A scheduler 246 may schedule UEs for data transmission on the downlink and/or uplink.

In some aspects, the UE 120 or base station 110 may include means for receiving, means for applying, and/or means for predicting. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
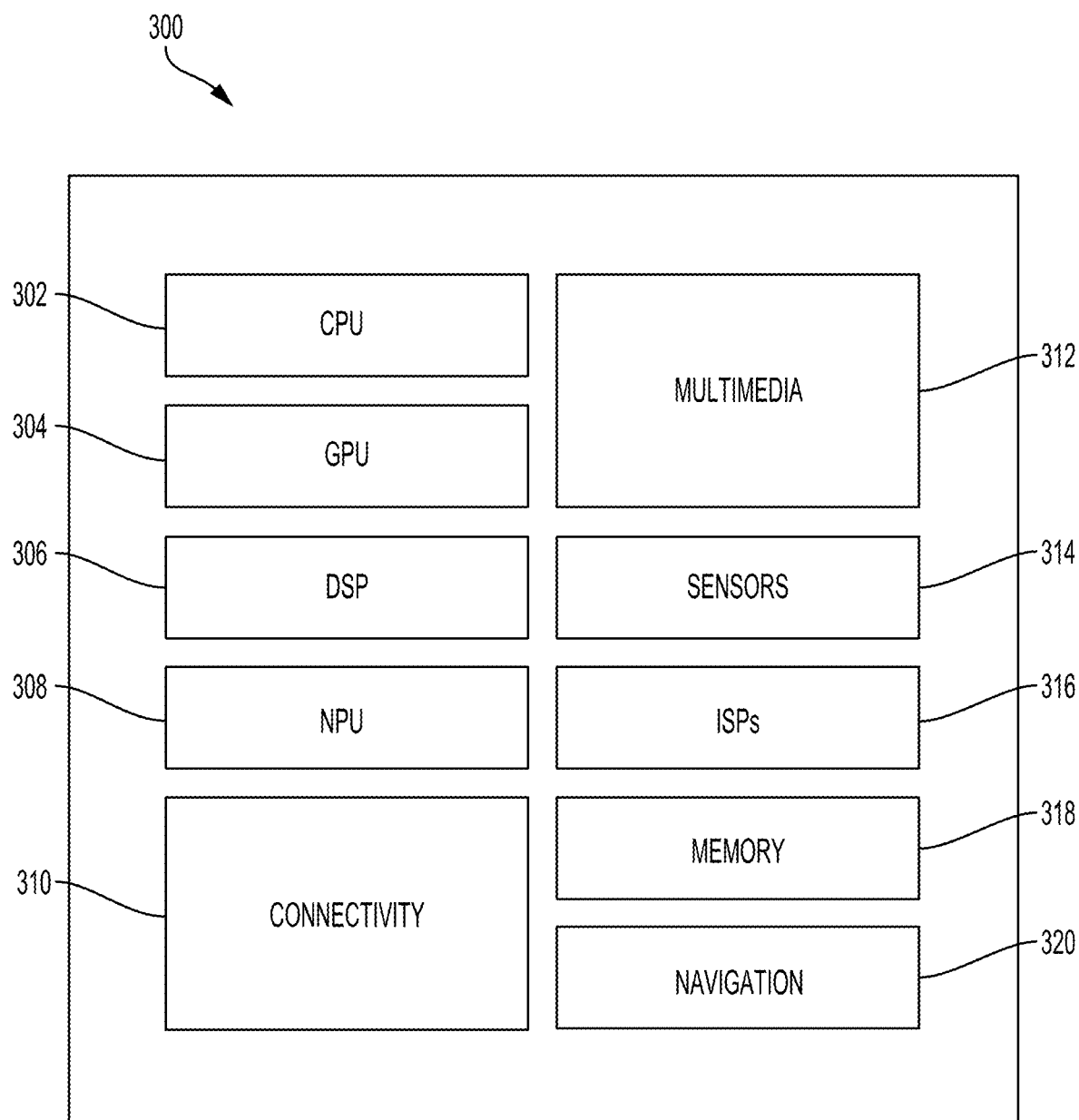
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to receive an input covariance matrix. The general-purpose processor 302 may also comprise code to apply convolutional layers to the input covariance matrix. The general-purpose processor 302 may also comprise code to apply pooling layers to the input covariance matrix. The general-purpose processor 302 may further comprise code to predict dominant eigen information of the input covariance matrix, after applying the convolutional layers and the pooling layers to the input covariance matrix.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
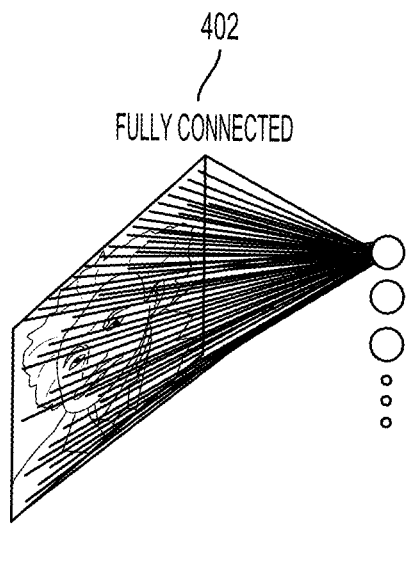
FIGS. 4A, 4B, and 4C are diagrams illustrating a neural network, in accordance with aspects of the present disclosure.
Figure 4B:
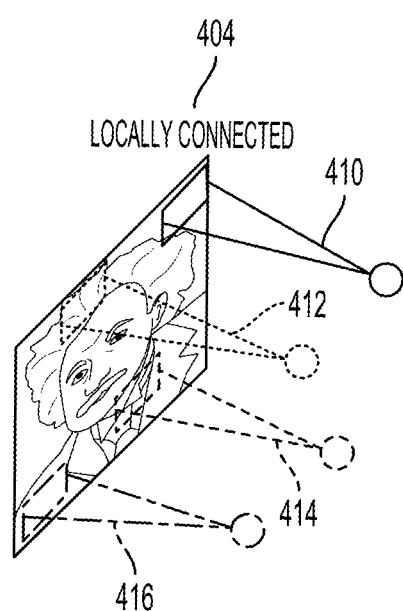

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
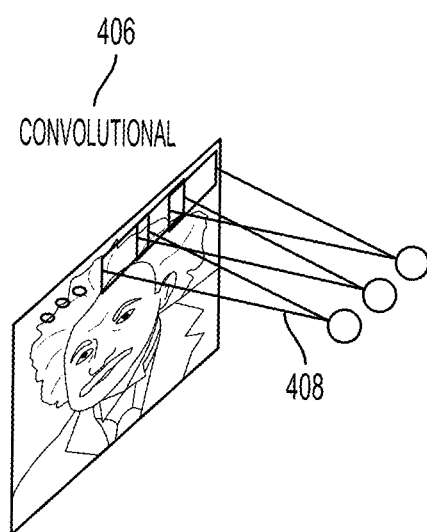

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
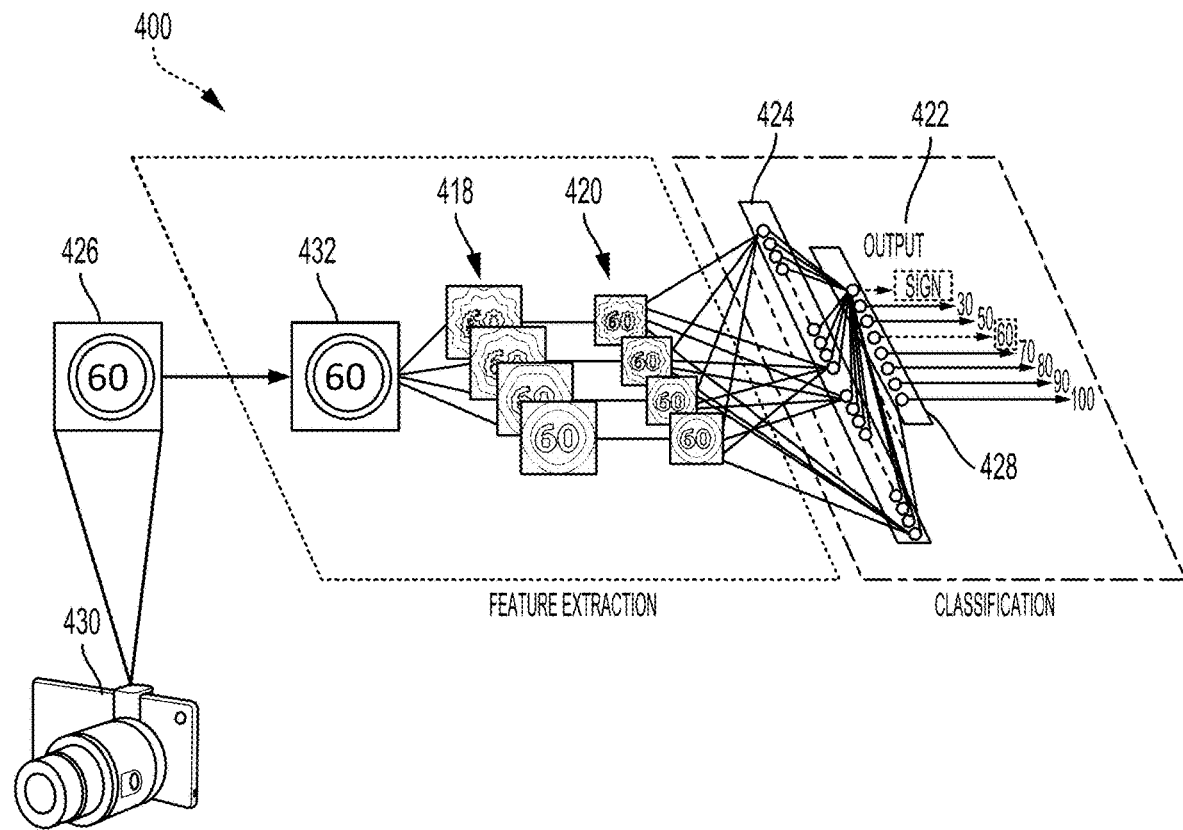
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
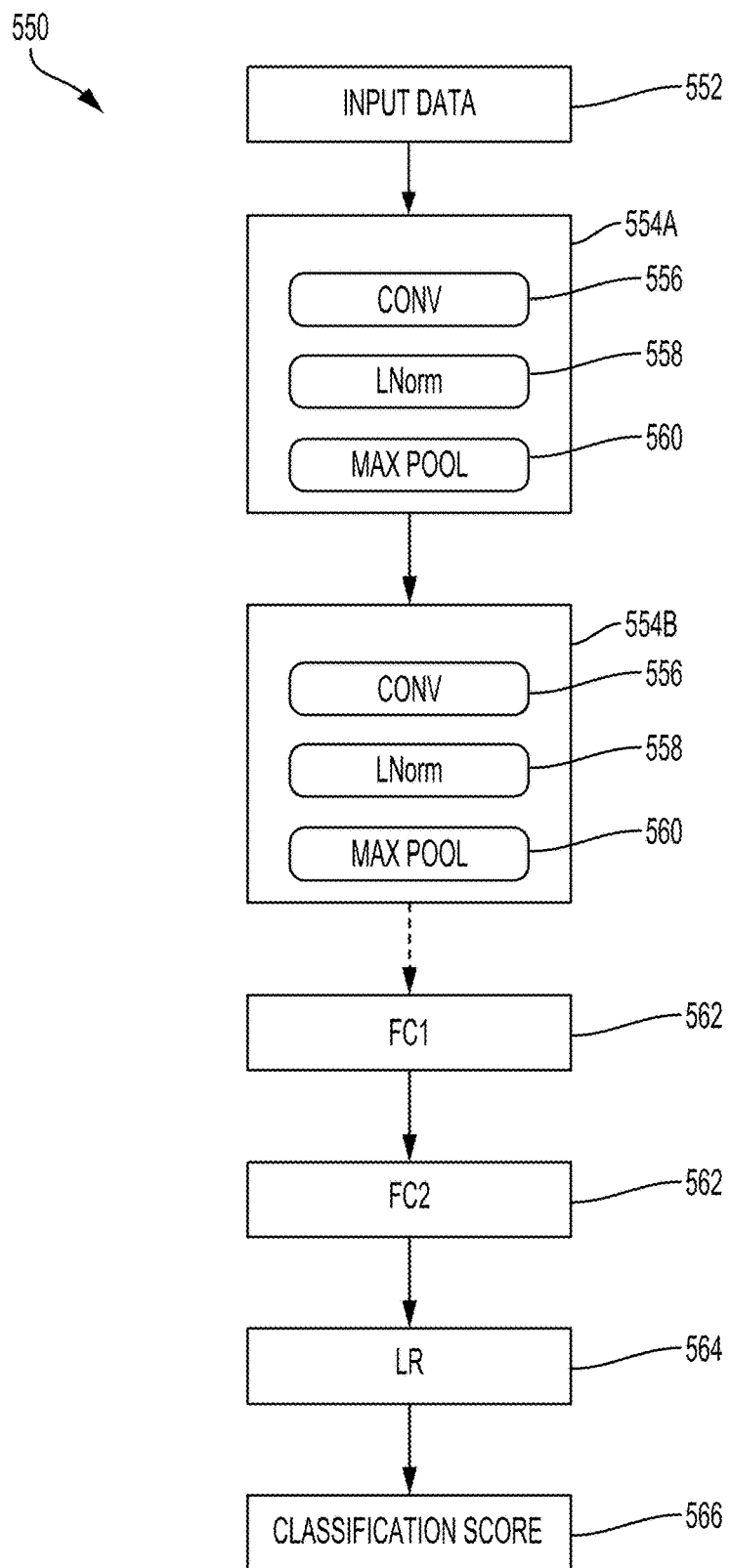
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

As described above, eigen value and eigen vector decomposition (EVD) provides an orthonormal basis to capture variations in data. Eigen value/vector decomposition has a broad range of applications, such as channel state feedback and multiple input multiple output (MIMO) systems, ranking in search engines and recommendation systems, and prediction in Markov processes such as the stock market. Additional applications include solving linear systems of equations and classification algorithms.

Conventional algorithms for eigen value/vector decomposition often rely on iterative algebraic solutions. These iterative solutions are suitable for well-conditioned matrices. Examples of such techniques include the power iteration, Givens iteration and Jacobi method, Householder transformation, and Lanczos iterations. While conventional algorithms offer fairly accurate solutions, the complexity of their implementation is usually high as the number of iterations increases. Moreover, assumptions are needed to ensure these solutions converge.

According to aspects of the present disclosure, a new technique predicts eigen values/vectors using neural networks. This new technique is twice as efficient as the well-known Jacobi iterations and estimates dominant eigen pairs with comparable accuracy. An eigen pair is an eigen value and its associated eigen vector. A dominant eigen pair is the eigen pair with the highest energy or equivalently eigen pair corresponding to the highest absolute eigen value. The term 'eigen information' is intended to cover both eigen values and eigen vectors.

According to aspects of the present disclosure, techniques will be described for 4×4 and 8×8 input covariance matrices. These techniques can be scaled to higher dimensions. The techniques focus on real-valued covariance inputs. The techniques may be extended to complex-valued covariance matrices. In some aspects of the present disclosure, all eigen pairs are returned, and the two most dominant eigen pairs are predicted with high accuracy. These techniques separate eigen value estimation from eigen vector estimation, which reduces the cost of computation when the goal is to only estimate eigen vectors or eigen values. For example, efficiencies can be achieved when only eigen vectors are desired, for instance, in a representation problem.

The Jacobi algorithm, with Givens iterations, gradually diagonalizes an input covariance matrix by preforming multiple rotation transforms on each off-diagonal element. The number of distinct off-diagonal elements of an n×n covariance matrix is $\binom{n}{2}$.

At each step of a Jacobi iteration, an off-diagonal element is targeted, and for that element, the Givens rotation matrix G is computed. Each rotation matrix updates two rows and two columns of the input matrix. At each step, two key updates occur:

$$A_{new} = G^h A_{old} G$$

$$V_{new} = V_{old} G$$

$$A_{old} = A_{new}$$

$$V_{old} = V_{new}$$

where H indicates the Hermitian matrix, $A_{old}$ is the input covariance matrix for the first iteration and $A_{new}$ thereafter, and $V_{old}$ is initially the identity matrix and $V_{new}$ thereafter. After several iterations and cycling over all off-diagonal elements, the $A_{new}$ and $V_{new}$ matrices approach eigen value and eigen vector matrices, respectively, provided that the input covariance matrix is well-conditioned. Although this solution may provide accurate results, the solution is computationally inefficient and may be computationally expensive for matrices of high dimensions.

According to aspects of the present disclosure, the two most dominant eigen pairs of a random positive definite covariance matrix with real-valued elements are efficiently extracted with a neural network. In some aspects, the proposed neural network is constructed in seven layers for eigen value extraction and eight layers for eigen vector extraction for a 4×4 input covariance matrix. An extension to an 8×8 matrix may include nine layers for eigen values and ten layers for eigen vectors.

Figure 6:
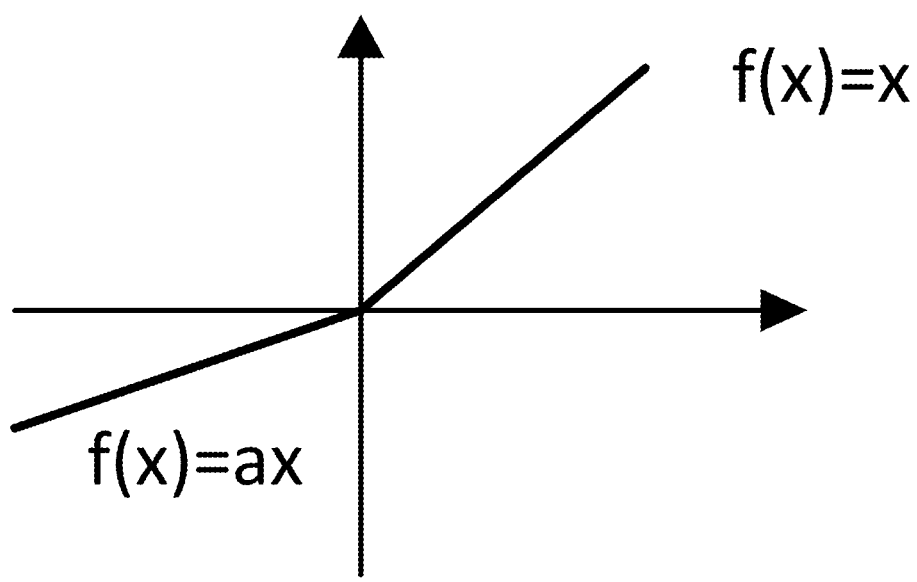
FIG. 6 is a graph illustrating a parametric rectified linear unit (PRELU) function.

According to aspects of the present disclosure, the hidden layers of the proposed neural network use two core filtering operations. The filters may be two dimensional convolution filters (CONV2D) and two dimensional average pooling filters (AVGPOOLING). An average pooling filter down samples the input received from the preceding convolutional layer by dividing the input into pooling regions and outputting the average value from each pooling region. In the convolutional layers, the parametric rectified linear units (PRELU) activation function may be used unless stated otherwise. The PRELU function is a piecewise linear function similar to the leaky rectified linear unit (RELU) with a tunable parameter a for negative numbers. FIG. 6 is a graph illustrating the parametric rectified linear unit (PRELU) function. An activation function is attached to each neuron of the neural network and determines whether a neuron activates (or fires).

During training of the neural network, the sign information and the absolute values may be estimated by the neural network as separate outputs. A prediction may occur for two channels, one for the absolute values of the two most dominant eigen values/vectors, and one channel for the corresponding sign information. To reduce dynamic range, the sign of each element may be coded as 0-1 labels. In other words, a binary zero/one classification occurs at the output layer for the channel carrying the sign information. In the proposed architecture for the absolute value estimation, the sign estimation only specifies addition of an extra channel to the output (predicted) array.

Aspects of the present disclosure directed to complex-valued covariance matrices, concatenate real and imaginary parts as two separate matrices of the same size. The real and imaginary parts are provided as a two-dimensional input covariance matrix to the neural network with two channels, where each matrix is treated as a separate channel for the overall input.

Figure 7:
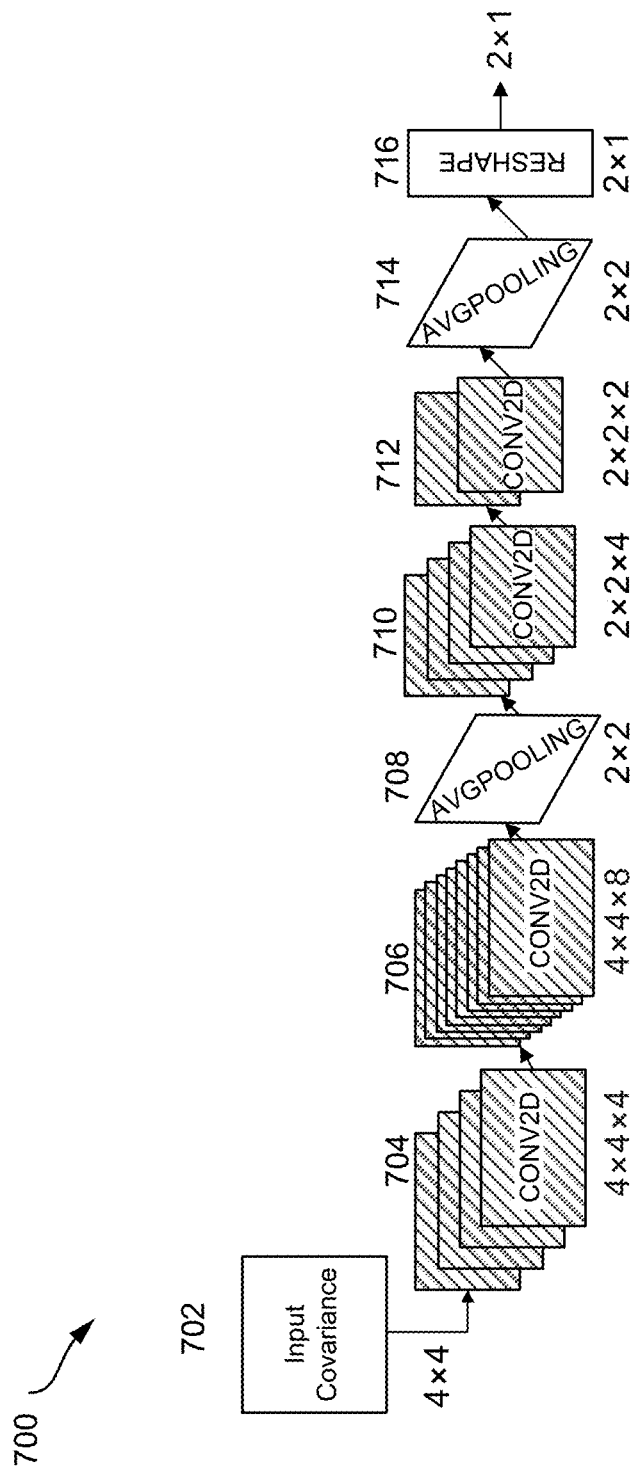
FIG. 7 is a block diagram illustrating an example neural network architecture for predicting absolute values of eigen values of a 4×4 real-valued input covariance matrix, in accordance with various aspects of the present disclosure.

FIG. 7 is a block diagram illustrating an example neural network architecture for predicting absolute values of eigen values of a 4×4 real-valued input covariance matrix, in accordance with various aspects of the present disclosure. The proposed neural network architecture 700 shown in FIG. 7 extracts the absolute value of the two most dominant eigen values for a 4×4 real-valued covariance input. This architecture 700 receives the input covariance matrix 702 directly and applies four layers of two-dimensional convolutional layers (CONV2D) 704, 706, 710, 712 with two layers of average pooling 708, 714. The dimensions of the kernel size of each layer and the number of channels used at each layer is specified in FIG. 7. The third dimension corresponds to the number of channels.

In the example of FIG. 7, the input covariance matrix is 4×4. The first convolutional layer 704 has a 4×4 kernel size, with four channels. The second convolutional layer 706 has a 4×4 kernel size, but has eight channels. The first and second pooling layers 708, 714 have a 2×2 kernel size. The third and fourth convolutional layers 710, 712 are 2×2, with the third convolutional layer 710 having four channels and the fourth convolutional layer 712 having two channels. The final reshaping layer 716 reshapes the two elements output from the second pooling layer 714 into a 2×1 vector, where one element represents the absolute value of each of the two most dominant eigen values.

Figure 8:
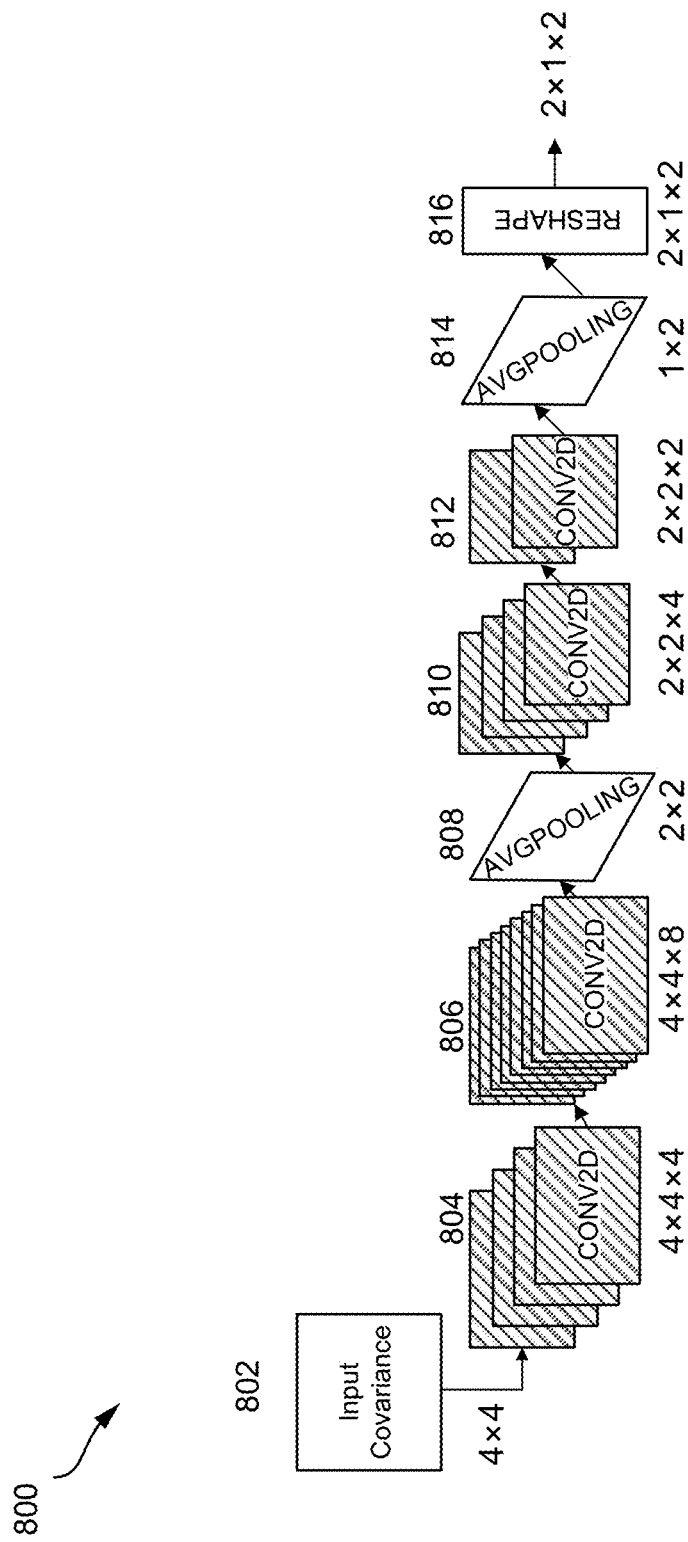
FIG. 8 is a block diagram illustrating another example neural network architecture for predicting eigen values (including sign information) of a 4×4 real-valued input covariance matrix, in accordance with various aspects of the present disclosure.

FIG. 8 is a block diagram illustrating another example neural network architecture for predicting eigen values (including sign information) of a 4×4 real-valued input covariance matrix, in accordance with various aspects of the present disclosure. The proposed neural network architecture 800 shown in FIG. 8 extracts sign information, as well as the absolute value of the two most dominant eigen values for a 4×4 real-valued covariance input. This architecture 800 receives the input covariance matrix 802 directly and applies four layers of two-dimensional convolutional layers 804, 806, 810, 812 with two layers of average pooling 808, 814. The dimensions of the kernel size of each layer and the number of channels used at each layer is specified in FIG. 8.

In the example of FIG. 8, the input covariance matrix is 4×4. The first convolutional layer 804 has a 4×4 kernel size, with four channels. The second convolutional layer 806 is also 4×4, but has eight channels. The first pooling layer 808 is 2×2. The third and fourth convolutional layers 810, 812 are 2×2, with the third convolutional layer 710 having four channels and the fourth convolutional layer 712 having two channels. The second pooling layer 814 is 1×2. The final reshaping layer 816 reshapes the output from the second pooling layer 814 into two channels of 2×1 vectors. In the first channel, each element represents the absolute value of each of the two most dominant eigen values. In the second channel, each element represents the sign information for each of the two most dominant eigen values. In the architectures 700, 800 of FIGS. 7 and 8, all convolutional layers 704, 706, 710, 712, 804, 806, 810, 812 use the PRELU activation function.

Figure 9:
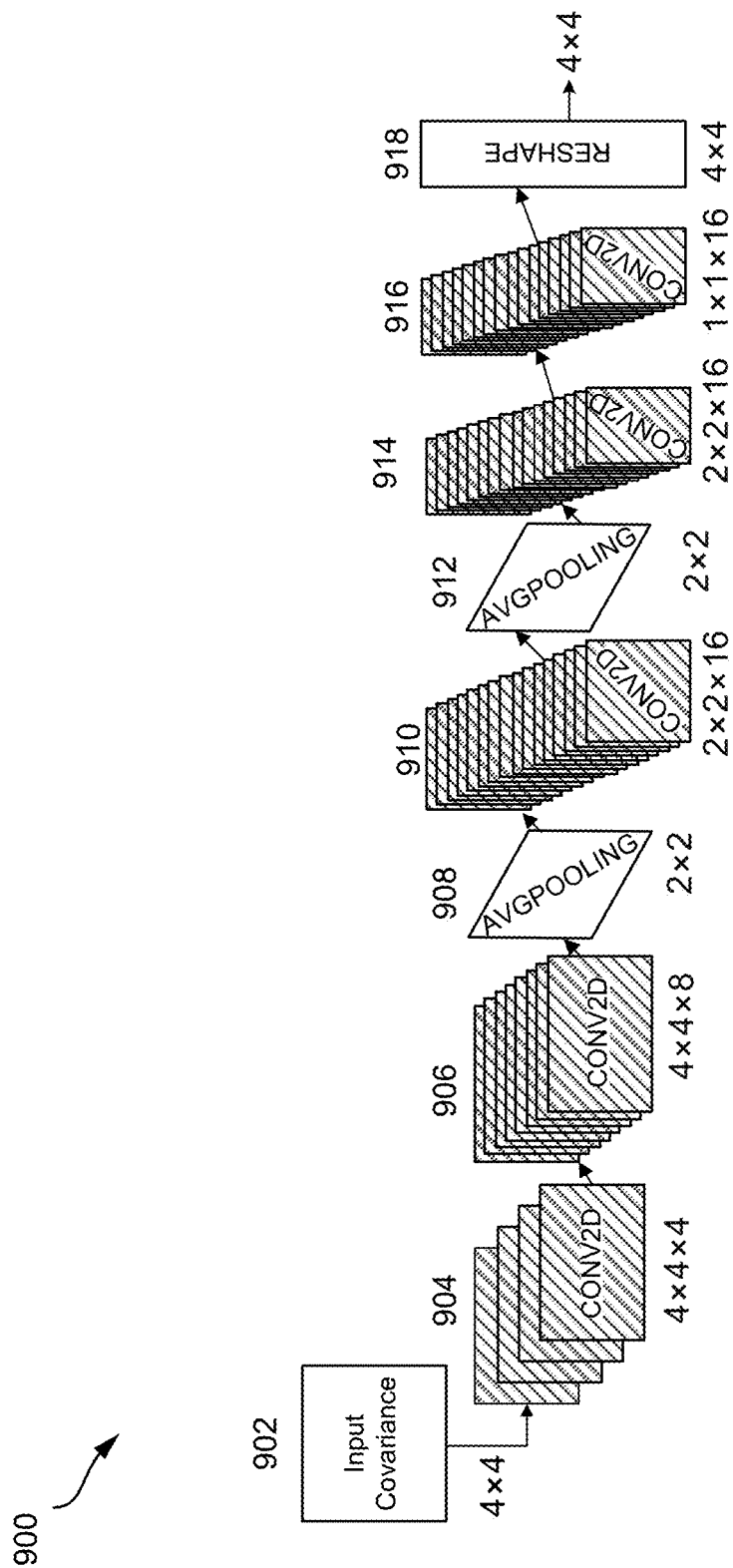
FIG. 9 is a block diagram illustrating an example neural network architecture for predicting absolute values of elements of eigen vectors of a 4×4 real-valued input covariance matrix, in accordance with various aspects of the present disclosure.

FIG. 9 is a block diagram illustrating an example neural network architecture for predicting absolute values of elements of eigen vectors of a 4×4 real-valued input covariance matrix, in accordance with various aspects of the present disclosure. The proposed eigen vector extraction architecture 800 computes the absolute value of the dominant eigen vectors of a 4×4 real-valued covariance matrix. In these aspects, all convolutional layers use the PRELU activation function, except the last layer which has no activation function. The last layer performs matrix multiplication, in other words, is a linear filter.

The final output of the neural network returns all eigen vectors of the matrix. According to aspects of the present disclosure, the accuracy of the two most dominant eigen vectors, which are the first two columns of the 4×4 matrix, is high.

In the example of FIG. 9, the input covariance matrix 902 is 4×4. The first convolutional layer 904 has a 4×4 kernel, with four channels. The second convolutional layer 906 is also 4×4, but has eight channels. The first and second pooling layers 908, 912 are 2×2. The third and fourth convolutional layers 910, 914 are 2×2, with each having sixteen channels. The fifth convolutional layer 916 is 1×1 with sixteen channels. The final reshaping layer 918 reshapes the output from the fifth convolutional layer 916 into a 4×4 matrix, where each element represents an absolute value of the eigen vectors of the input covariance matrix 902.

Figure 10:
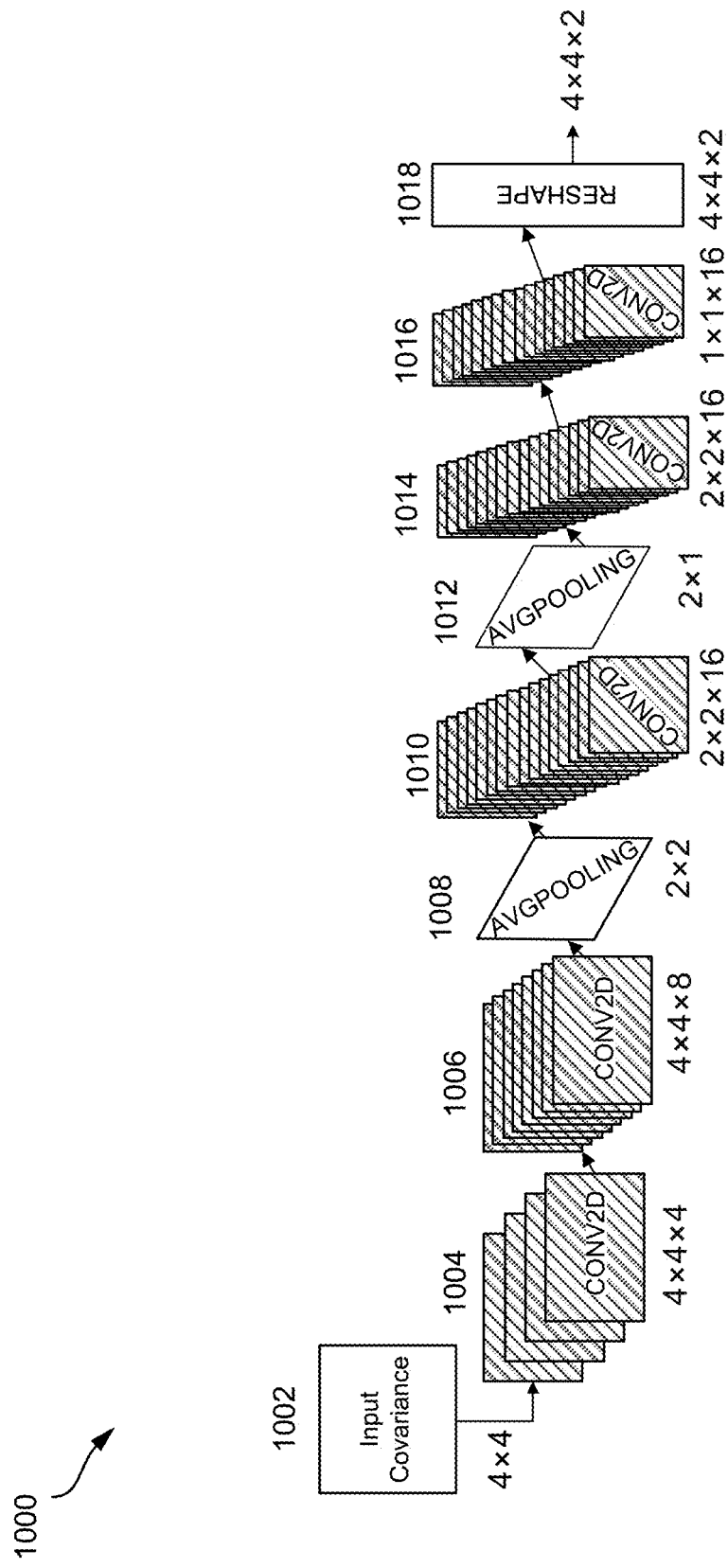
FIG. 10 is a block diagram illustrating another example neural network architecture for predicting eigen vectors (including sign information) of a 4×4 real-valued input covariance matrix, in accordance with various aspects of the present disclosure.

FIG. 10 is a block diagram illustrating another example neural network architecture for predicting eigen vectors (including sign information) of a 4×4 real-valued input covariance matrix, in accordance with various aspects of the present disclosure. The proposed neural network architecture 1000 shown in FIG. 10 extracts sign information, as well as the eigen vectors for a 4×4 real-valued covariance input.

In the example of FIG. 10, the input covariance matrix 1002 is 4×4. The first convolutional layer 1004 has a 4×4 kernel size, with four channels. The second convolutional layer 1006 is also 4×4, but has eight channels. The first pooling layer 1008 is 2×2. The second pooling layer 1012 is 2×1. The third and fourth convolutional layers 1010, 1014 are 2×2, with each having sixteen channels. The fifth convolutional layer 1016 is 1×1 with sixteen channels. The final reshaping layer 1018 reshapes the output from the fifth convolutional layer 1016 into a 4×4 matrix with two channels. Each element of the matrix in the first channel represents an absolute value of the eigen vectors of the input covariance matrix 1002. Each element of the matrix in the second channel represents sign information for the eigen vectors of the input covariance matrix 1002.

According to aspects of the present disclosure, extension to an 8×8 covariance matrix is achieved by adding one convolutional layer and one average pooling layer to the architecture and doubling the number of channels in all of the layers. The dimension of each layer is shown in FIG. 11. In the example of FIG. 10, all convolutional layers use the PRELU activation function, except the last layer which has no activation function. The last layer is a linear filter. The network architecture may be extended to higher dimensions in a similar fashion, provided that the input covariance matrix dimension is a power of two.

FIG. 11 is a diagram illustrating an example neural network architecture for predicting absolute values of elements of eigen vectors of an 8×8 real-valued input covariance matrix, in accordance with various aspects of the present disclosure. In the example of FIG. 11, the last layer returns an 8×8 output matrix, potentially returning all eigen vectors of the matrix including accurate predictions of the two most dominant eigen vectors. The architecture may be further scaled up to any covariance matrix with a power of two dimension.

The matrix multiplications used in hidden layers of the proposed architectures are element-wise operations, which have a complexity of $O(n^2)$. All activation functions are either linear or piece-wise linear, which is easy to implement on either hardware or firmware processors. The machine learning processes of the present disclosure accurately estimates dominant eigen pairs of random real-valued covariance matrices. Furthermore, the extension to complex-valued covariance matrices is proposed. The complexity of the proposed methods is even lower than the well-known Jacobi eigen value/vector decomposition extraction technique. The proposed solution is two times more efficient in operation counts than the Jacobi method.

Figure 12:
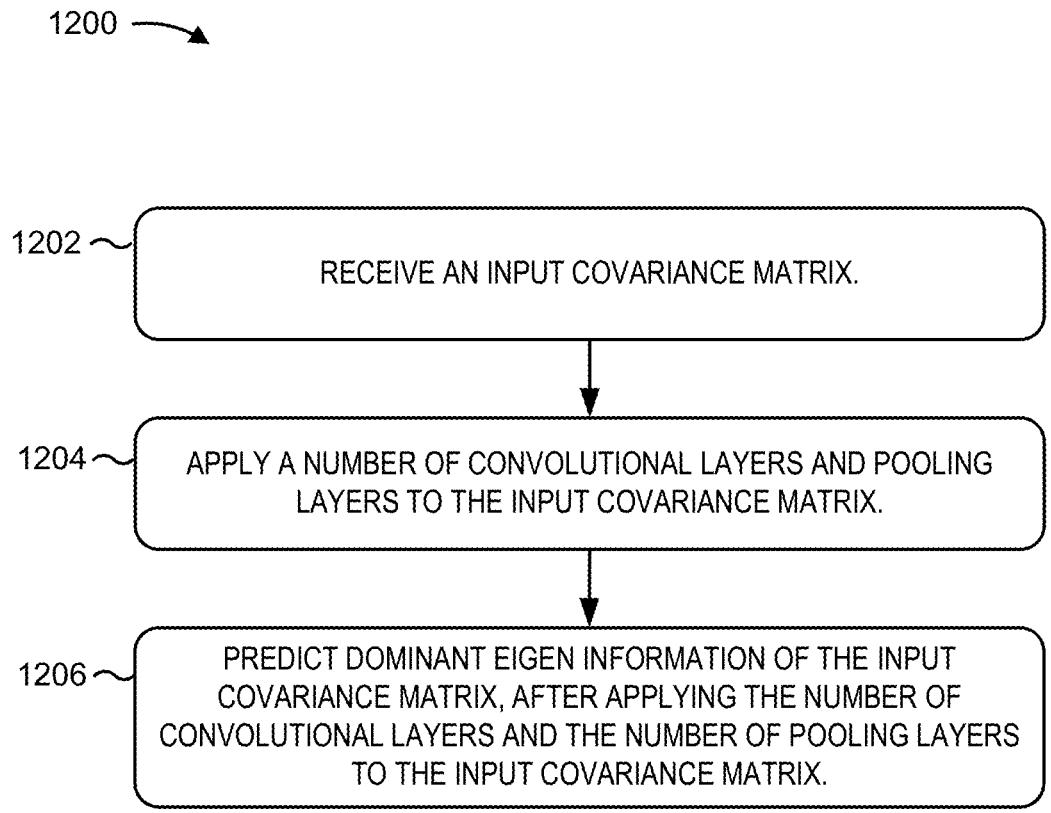
FIG. 12 is a flow diagram illustrating eigen vector and/or eigen value decomposition of an input covariance matrix, in accordance with various aspects of the present disclosure.

FIG. 12 is a flow diagram illustrating an example process 1200 for eigen vector and/or eigen value decomposition of an input covariance matrix, in accordance with various aspects of the present disclosure. As shown in FIG. 12, in some aspects, the process 1200 may include receiving an input covariance matrix (block 1202). For example, the user equipment (UE) or base station (e.g., using the antenna 252, 234, DEMOD/MOD 254,232, MIMO detector 256, 236, receive processor 258, 238, controller/processor 280, 240, and/or memory 282 242) can receive an input covariance matrix.

The process 1200 may also include applying convolutional layers and pooling layers to the input covariance matrix (block 1204). For example, the UE (e.g., using the controller/processor 280, 240, and/or memory 282, 242) can apply convolutional layers and pooling layers to the input covariance matrix. The process 1200 may also include predicting dominant eigen information of the input covariance matrix, after applying the convolutional layers and the pooling layers to the input covariance matrix (block 1206). For example, the UE (e.g., using the controller/processor 280, 240, and/or memory 282, 242) can predict dominant eigen information of the input covariance matrix.

Implementation examples are described in the following numbered clauses.

1. A method of performing eigen decomposition with an artificial deep neural network, comprising:
   receiving an input covariance matrix;
   applying a plurality of convolutional layers and a plurality of pooling layers to the input covariance matrix; and
   predicting dominant eigen information of the input covariance matrix, after applying the plurality of convolutional layers and the plurality of pooling layers to the input covariance matrix.
2. The method of clause 1, in which the plurality of pooling layers comprise a plurality of average pooling layers.
3. The method of any of the preceding clauses, in which the input covariance matrix comprises a real-valued covariance matrix.
4. The method of clause 1 or 2, in which the input covariance matrix comprises a complex-valued covariance matrix.
5. The method of clause 4, in which the complex-valued covariance matrix comprises a concatenated pair of matrices, including a first matrix of real components and a second matrix of imaginary components.
6. The method of any of the preceding clauses, in which the dominant eigen information comprises absolute values of a pair of dominant eigen values and sign information of the pair of dominant eigen values.
7. The method of clause 6, in which the sign information comprises an additional channel in an output array.
8. The method of any of the preceding clauses, in which the plurality of convolutional layers implement a parametric rectified linear unit (PRELU) activation function.
9. The method of any of the preceding clauses, in which the dominant eigen information comprises absolute values of a pair of dominant eigen vectors and sign information of the pair of dominant eigen vectors.
10. The method of clause 9, in which the sign information comprises an additional channel in an output array.
11. The method of clause 9 or 10, in which some of the plurality of convolutional layers implement a parametric rectified linear unit (PRELU) activation function except a last convolutional layer, which does not have a non-linear activation function.
12. An apparatus for wireless communication by a user equipment (UE), comprising:
    a processor,
    memory coupled with the processor; and
    instructions stored in the memory and operable, when executed by the processor, to cause the apparatus:
    to receive an input covariance matrix;
    to apply a plurality of convolutional layers and a plurality of pooling layers to the input covariance matrix; and
    to predict dominant eigen information of the input covariance matrix, after applying the plurality of convolutional layers and the plurality of pooling layers to the input covariance matrix.
13. The apparatus of clause 12, in which the plurality of pooling layers comprise a plurality of average pooling layers.
14. The apparatus of any of the preceding clauses, in which the input covariance matrix comprises a real-valued covariance matrix.
15. The apparatus of clause 12 or 13, in which the input covariance matrix comprises a complex-valued covariance matrix.
16. The apparatus of clause 15, in which the complex-valued covariance matrix comprises a concatenated pair of matrices, including a first matrix of real components and a second matrix of imaginary components.
17. The apparatus of any of the preceding clauses, in which the dominant eigen information comprises absolute values of a pair of dominant eigen values and sign information of the pair of dominant eigen values.
18. The apparatus of clause 17, in which the sign information comprises an additional channel in an output array.
19. The apparatus of any of the preceding clauses, in which the plurality of convolutional layers implement a parametric rectified linear unit (PRELU) activation function.
20. The apparatus of any of the preceding clauses, in which the dominant eigen information comprises absolute values of a pair of dominant eigen vectors and sign information of the pair of dominant eigen vectors.
21. The apparatus of clause 20, in which the sign information comprises an additional channel in an output array.
22. The apparatus of clause 20 or 21, in which some of the plurality of convolutional layers implement a parametric rectified linear unit (PRELU) activation function except a last convolutional layer, which does not have a non-linear activation function.

23. An apparatus, comprising:
    means for receiving an input covariance matrix;
    means for applying a plurality of convolutional layers and a plurality of pooling layers to the input covariance matrix; and
    means for predicting dominant eigen information of the input covariance matrix, after applying the plurality of convolutional layers and the plurality of pooling layers to the input covariance matrix.

24. The apparatus of clause 23, in which the plurality of pooling layers comprise a plurality of average pooling layers.

25. The apparatus of any of the preceding clauses, in which the input covariance matrix comprises a real-valued covariance matrix.

26. The apparatus of clause 23 or 24, in which the input covariance matrix comprises a complex-valued covariance matrix.

27. The apparatus of clause 26, in which the complex-valued covariance matrix comprises a concatenated pair of matrices, including a first matrix of real components and a second matrix of imaginary components.

28. The apparatus of any of the preceding clauses, in which the dominant eigen information comprises absolute values of a pair of dominant eigen values and sign information of the pair of dominant eigen values.

29. The apparatus of clause 28, in which the sign information comprises an additional channel in an output array.

30. The apparatus of any of the preceding clauses, in which the plurality of convolutional layers implement a parametric rectified linear unit (PRELU) activation function.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of performing eigen decomposition with an artificial deep neural network, comprising:
    receiving an input covariance matrix;
    applying a first two dimensional convolutional layer to the input covariance matrix by implementing a parametric rectified linear unit (PRELU) activation function to generate a first output;
    applying a second two dimensional convolutional layer to the first output by implementing the PRELU activation function to generate a second output;
    applying a first two dimensional average pooling layer to the second output to generate a first pooled output;
    applying a third two dimensional convolutional layer to the first pooled output by implementing the PRELU activation function to generate a third output;
    applying a second two dimensional average pooling layer to the third output to generate a second pooled output; and
    predicting dominant eigen information of the input covariance matrix by processing the second pooled output into an output array having a first channel representing absolute values of the dominant eigen information.

2. The method of claim 1, in which the input covariance matrix comprises a real-valued covariance matrix.

3. The method of claim 1, in which the input covariance matrix comprises a complex-valued covariance matrix.

4. The method of claim 3, in which the complex-valued covariance matrix comprises a concatenated pair of matrices, including a first matrix of real components and a second matrix of imaginary components.

5. The method of claim 1, in which the dominant eigen information comprises absolute values of a pair of dominant eigen values and sign information of the pair of dominant eigen values.

6. The method of claim 5, in which the sign information comprises an additional channel in the output array.

7. The method of claim 1, in which the dominant eigen information comprises absolute values of a pair of dominant eigen vectors and sign information of the pair of dominant eigen vectors.

8. The method of claim 7, in which the sign information comprises an additional channel in the output array.

9. The method of claim 7, further comprising applying a final two dimensional convolutional layer to a convolved second pooled output by performing matrix multiplication without an activation function.

10. An apparatus for wireless communication by a user equipment (UE), comprising:
at least one processor, memory coupled with the at least one processor; and
instructions stored in the memory and operable, when executed by the at least one processor, to cause the apparatus:
to receive an input covariance matrix;
to apply a first two dimensional convolutional layer to the input covariance matrix by implementing a parametric rectified linear unit (PRELU) activation function to generate a first output;
to apply a second two dimensional convolutional layer to the first output by implementing the PRELU activation function to generate a second output;
to apply a first two dimensional average pooling layer to the second output to generate a first pooled output;
to apply a third two dimensional convolutional layer to the first pooled output by implementing the PRELU activation function to generate a third output;
to apply a second two dimensional average pooling layer to the third output to generate a second pooled output; and
to predict dominant eigen information of the input covariance matrix by processing the second pooled output into an output array having a first channel representing absolute values of the dominant eigen information.

11. The apparatus of claim 10, in which the input covariance matrix comprises a real-valued covariance matrix.

12. The apparatus of claim 10, in which the input covariance matrix comprises a complex-valued covariance matrix.

13. The apparatus of claim 12, in which the complex-valued covariance matrix comprises a concatenated pair of matrices, including a first matrix of real components and a second matrix of imaginary components.

14. The apparatus of claim 10, in which the dominant eigen information comprises absolute values of a pair of dominant eigen values and sign information of the pair of dominant eigen values.

15. The apparatus of claim 14, in which the sign information comprises an additional channel in the output array.

16. The apparatus of claim 10, in which the dominant eigen information comprises absolute values of a pair of dominant eigen vectors and sign information of the pair of dominant eigen vectors.

17. The apparatus of claim 16, in which the sign information comprises an additional channel in the output array.

18. The apparatus of claim 16, in which the at least one processor is further configured to apply a final two dimensional convolutional layer to a convolved second pooled output by performing matrix multiplication without an activation function.

19. An apparatus, comprising:
means for receiving an input covariance matrix;
means for applying a first two dimensional convolutional layer to the input covariance matrix by implementing a parametric rectified linear unit (PRELU) activation function to generate a first output;
means for applying a second two dimensional convolutional layer to the first output by implementing the PRELU activation function to generate a second output;
means for applying a first two dimensional average pooling layer to the second output to generate a first pooled output;
means for applying a third two dimensional convolutional layer to the first pooled output by implementing the PRELU activation function to generate a third output;
means for applying a second two dimensional average pooling layer to the third output to generate a second pooled output; and
means for predicting dominant eigen information of the input covariance matrix by processing the second pooled output into an output array having a first channel representing absolute values of the dominant eigen information.

20. The apparatus of claim 19, in which the input covariance matrix comprises a real-valued covariance matrix.

21. The apparatus of claim 19, in which the input covariance matrix comprises a complex-valued covariance matrix.

22. The apparatus of claim 21, in which the complex-valued covariance matrix comprises a concatenated pair of matrices, including a first matrix of real components and a second matrix of imaginary components.

23. The apparatus of claim 19, in which the dominant eigen information comprises absolute values of a pair of dominant eigen values and sign information of the pair of dominant eigen values.

24. The apparatus of claim 23, in which the sign information comprises an additional channel in the output array.

* * * * *